United States Patent
Kalenius et al.

(10) Patent No.: US 7,403,977 B2
(45) Date of Patent: Jul. 22, 2008

(54) MOBILE PHONE HAVING HINTING CAPABILITIES FOR OPERATION FUNCTION SELECTION

(75) Inventors: Mika Kalenius, Espoo (FI); Kimmo Hämynen, Espoo (FI)

(73) Assignee: Nokia Corporation, Espoo (FI)

( * ) Notice: Subject to any disclaimer, the term of this patent is extended or adjusted under 35 U.S.C. 154(b) by 789 days.

(21) Appl. No.: 10/686,504

(22) Filed: Oct. 14, 2003

(65) Prior Publication Data

US 2005/0079895 A1    Apr. 14, 2005

(51) Int. Cl.
*G06F 13/00* (2006.01)
(52) U.S. Cl. .................. 709/217; 709/250; 719/328
(58) Field of Classification Search ................ 709/217, 709/219, 250; 719/328, 329
See application file for complete search history.

(56) References Cited

U.S. PATENT DOCUMENTS

| | | | |
|---|---|---|---|
| 6,198,939 B1* | 3/2001 | Holmstrom et al. | 455/566 |
| 6,223,059 B1* | 4/2001 | Haestrup | 455/566 |
| 6,310,609 B1* | 10/2001 | Morgenthaler | 345/170 |
| 6,804,537 B1* | 10/2004 | Fujii | 455/557 |
| 6,853,368 B2* | 2/2005 | Muthuswamy et al. | 345/168 |
| 6,906,701 B1* | 6/2005 | Oueslati et al. | 345/170 |
| 6,950,988 B1 | 9/2005 | Hawkins et al. | 715/700 |
| 6,957,397 B1 | 10/2005 | Hawkins et al. | 715/856 |
| 7,072,460 B2* | 7/2006 | Wong et al. | 379/355.05 |
| 2001/0029425 A1* | 10/2001 | Myr | 701/200 |
| 2003/0234821 A1* | 12/2003 | Pugliese | 345/816 |
| 2004/0095327 A1* | 5/2004 | Lo | 345/169 |
| 2006/0205431 A1 | 9/2006 | Newstead | 455/550.1 |

* cited by examiner

*Primary Examiner*—Viet Vu
(74) *Attorney, Agent, or Firm*—Ware, Fressola, Van Der Sluys & Adolphson LLP

(57) ABSTRACT

A mobile phone and related method for providing hinting capabilities in the mobile telephone is presented which makes a user aware of one or more next possible sub-operational functionalities available for user selection in a selected operational functionality. Control and alphanumeric keys associated with the available functionalities are identified to hint at next possible sub-functionalities available for selection wherein the keys are identified by lighting or shown as icon representations on the display of the mobile phone or tones to suggest to the user that operation of the key is related to the given operational context and sequence progression step in the selected desired operational functionality.

39 Claims, 14 Drawing Sheets

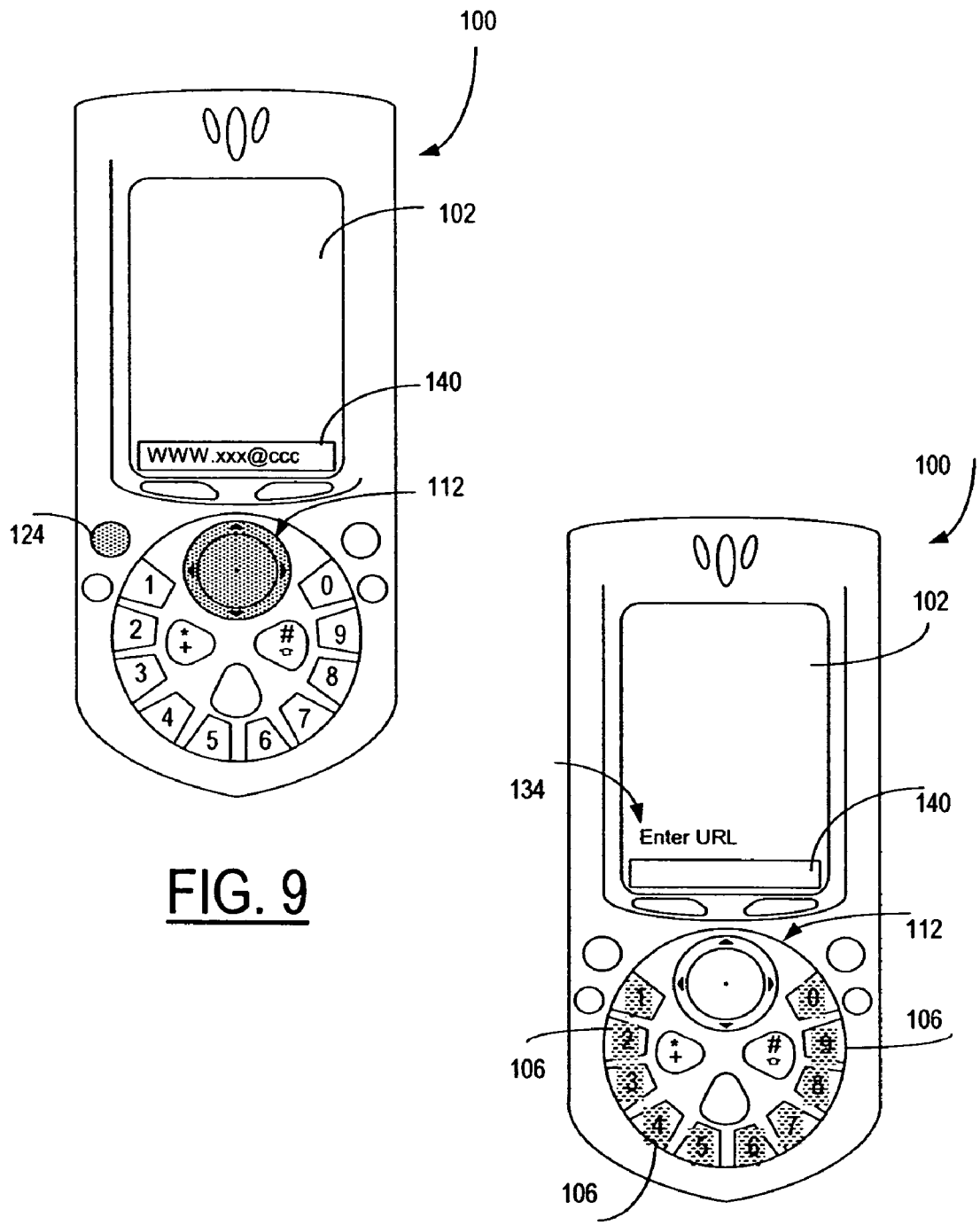

MOBILE PHONE HAVING HINTING CAPABILITIES FOR OPERATION FUNCTION SELECTION

TECHNICAL FIELD

The present invention deals generally with user operation of portable electronic devices and deals more particularly a mobile telephones such as a cellular telephone having hinting capabilities for making a user aware of possible next functions available for selection.

BACKGROUND OF THE INVENTION

There has been an increasing demand for more and more features in portable electronic devices, particularly mobile telephones such as for example, cellular telephones. Generally, the operation of the features are carried out by operating a combination of one or more keys which may be selection keys or alphanumeric keys such as typically found on and used with cellular telephones. One such prior art cellular telephone is shown in FIG. 1 and generally designated 10. The cellular telephone includes a display 12 for displaying text and/or graphics, selection keys 14, 16 for selecting desired operational functionalities of the cellular phone, keypad means generally designated 18 for inputting alphanumeric characters to the phone, a scrolling means generally designated 20 which may be part of the keypad 18 for navigating sub-operational functionalities within a selected operational functionality, and various control keys 22 and 24, for example, to send a call or end a call. The alphanumeric keys 26, 26 may be part of a physical keypad 18 as illustrated or may be part of a virtual keypad, for example a keypad representation on the display screen of the device (not shown) and operated in a well known manner including pen and touch screen operation.

Many of the features included with the portable electronic device such as the cellular telephone are complex and their operation may be menu driven with multiple selection options available through nested sub-menus as illustrated in cascading menu form in FIG. 2 for example. Often, the menu sub-operation selections are not intuitive and cause the user to guess at which operations or key selections should be made to perform the desired operation selection for a given selected desired function.

Further, other features and functions may not be frequently used to enable the user to memorize the necessary sequence of operation steps to carry out the desired selected function much less to become proficient with the operation of the desired feature. Generally, user manuals accompany the portable electronic device to explain the step-by-step operations necessary to carry out the desired function. Obviously, it is inconvenient to carry and time consuming to refer to the user manual each time the user wants to select and operate a feature, particularly an unfamiliar feature or function. It is difficult, even with the user's manual to know with certainty which menu selection step to take in the sequence of steps to carry out or progress in the desired feature or function. Even with practice it takes some time to learn with confidence the steps and possible operational functions available for selection to carry out the desired feature or function.

It would be desirable to provide portable electronic devices such as mobile telephones and particularly cellular telephones that overcome the limitations and deficiencies of the prior art in learning, selecting, and operating desired features and functions of the device.

It would be further desirable if a user of the device could be made aware without guessing of possible operation functions available for selection in a desired chosen function.

Accordingly, it is an object of the present invention to provide a portable electronic device such as a mobile telephone and particularly a cellular telephone with hinting capabilities to make a user aware of next possible operation functions available for selection in a desired chosen function.

It is a further object of the present invention to provide a method for use in a portable electronic device such as a mobile telephone and particularly a cellular telephone that serves as a learning tool to assist a user to learn the necessary operation functions in a desired chosen function.

SUMMARY OF THE INVENTION

The invention concerns a portable electronic device such as a mobile telephone that has hinting capabilities for alerting a user to next possible sub-functionalities available for selection in carrying out a desired chosen function. The invention also relates to an associated method for carrying out the hinting capability operation of the mobile telephone. In a first embodiment of the invention, a mobile phone has means for displaying text/graphics, means for inputting alphanumeric characters to the phone, means for selecting desired operational functionalities of the phone and means for navigating sub-operational functionalities within a selected operational functionality wherein the improvement is characterized by means for making a user aware of one or more next possible sub-operational functionalities available for user selection in the selected operational functionality. Preferably, the mobile phone is further characterized by lighting one or more selection keys associated with next possible sub-operational functionalities available for user selection. Preferably, the mobile phone includes means for deactivating the means for making a user aware of next possible sub-operational functionalities. Preferably, the illuminated selection key is color illuminated. Preferably, the illuminated selection key flashes on and off. Preferably, one or more distinctive tones each of which corresponds to a given selection key is provided to make the user aware of next possible sub-operational functionalities. Preferably an icon of a key corresponding to a short-cut key is shown on the display.

In another embodiment of the invention, a mobile phone has a display for showing text graphics, keypad means for inputting alphanumeric characters to the phone and for selecting and accessing desired operational functionalities and features of the phone wherein the phone has at least one menu driven operational function, the improvement comprising means for making a user aware of one or more possible next feature selections available in the menu driven operational function. One or more feature selections shown in a menu list of features in the menu driven operational function are highlighted or may be voice announced to alert the user of possible selection. The mobile phone preferably has voice recognition means for responding to a feature selection spoken by the user.

In a further aspect of the embodiment, a mobile phone has a display screen, a memory for storing at least one instruction set for carrying out the functions of the mobile phone, a keypad for selecting a desired function and for operating the mobile phone, and means for providing an indication to the user of next possible functionalities available for selection corresponding to the operational context and sequence progression steps of the given desired function chosen by the user.

Preferably, the means for providing an indication is further characterized by a visual indication of one or more keys each of which keys is associated with a next possible functionality available for selection. The keypad may be a physical keypad or a virtual keypad. Preferably, a text message associated with each of the one or more keys is shown on the display screen to explain the functionality of the key. Preferably, the visual indication is an illuminated key. Preferably, the illuminated key is a colored key. Preferably, the colored key changes color to provide the visual indication.

In a yet further embodiment of the invention, a mobile phone has a display screen, electronic circuit means for carrying out the operational functions of the phone, memory means coupled to the electronic circuitry means for storing at least one instruction set for controlling the operation of the phone, and means for selecting a desired operational function and means for hinting at next possible operational functionalities available for selection corresponding to the operational context and progression stage in the given selected desired function.

In a still further embodiment of the invention, a method for providing hinting capabilities in a mobile telephone such as a cellular telephone is provided. The method is characterized by the steps of identifying a desired operational function; selecting the identified desired operational function, such as for example, access to the global computer network; determining additional sub-functionalities available for the selected operational function; associating a key such as a control or alphanumeric key of the mobile phone with each of the available sub-functionalities and identifying one or more of the associated keys to hint at the next possible sub-functionalities available for selection corresponding to the given operational context and sequence progression step in the selected operational function.

Preferably, the step of determining additional sub-functionalities is further characterized by identifying all additional functionalities available for selection.

Preferably, the step of identifying one or more associated keys is further characterized by illuminating the key to make a user aware of its availability for selection as a next possible operational functionality. The key may be illuminated in different colors or flashed on and off.

Preferably, the step of identifying one or more associated keys is characterized by showing an icon representing the associated key on the display of the mobile phone to make a user aware of its availability for selection as a next possible operational functionality. Preferably, the associated key is a short-cut key.

Preferably, the step of identifying one or more associated keys is characterized by providing one or more distinctive audio tones each of which corresponds to an identified associated key.

Preferably, the method includes operating the associated key to select the sub-functionality. The associated key may be operated by voice recognition operation by speaking the name of the associated key.

In still another embodiment of the invention, a computer program is stored in a computer readable medium for carrying out the method steps of the invention.

BRIEF DESCRIPTION OF THE DRAWINGS

Other features, objects and advantages of the present invention will become readily apparent from the following written description taken in conjunction with the following drawings wherein:

FIG. 9 shows the mobile phone of FIG. 8 wherein the URL address has been selected and the scroll key and the talk key are illuminated to hint that a different URL address can be selected or that the selected URL address can be sent by operating the talk key;

FIG. 10 shows the mobile phone of FIG. 4 wherein the alphanumeric keys of the keypad are illuminated to hint at entering the desired URL address;

WRITTEN DESCRIPTION OF PREFERED EMBODIMENTS

Figure 1:
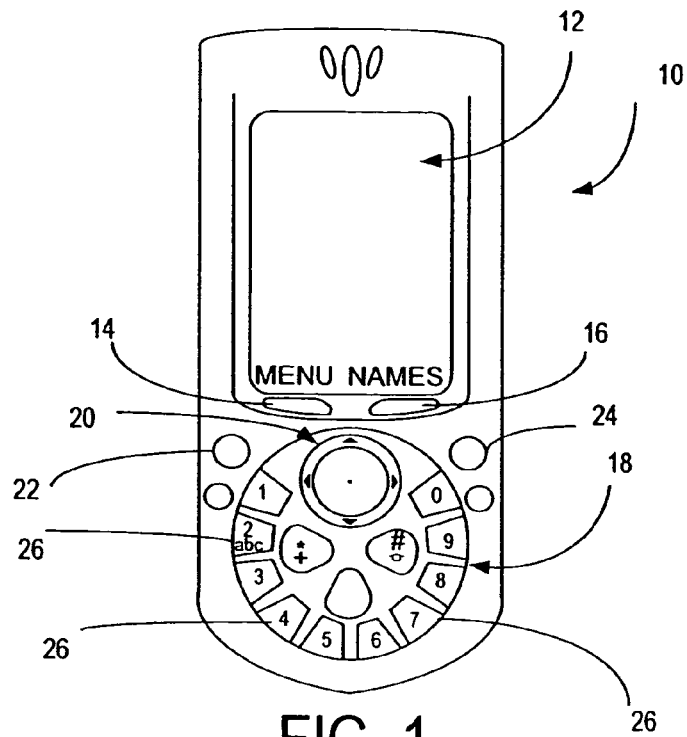
FIG. 1 is a schematic representation of a menu driven operation selection mobile telephone typical of the prior art.
Figure 2:
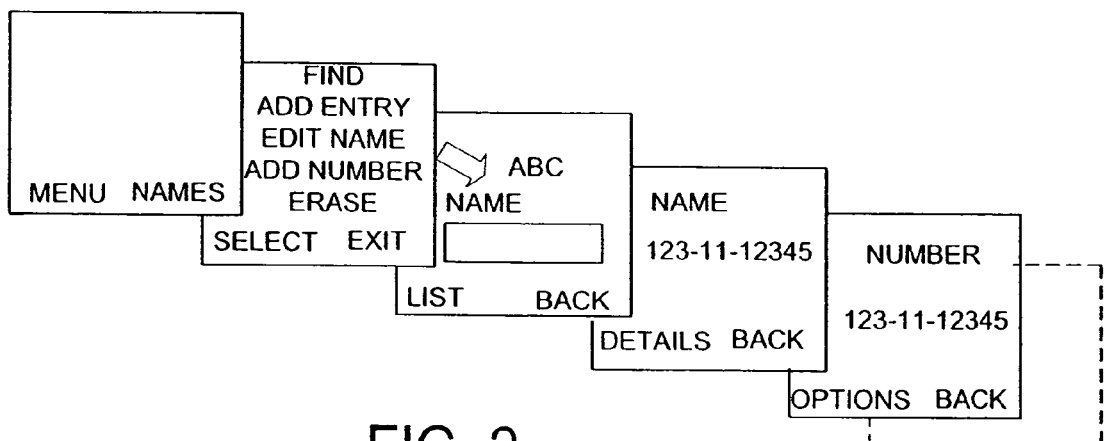
FIG. 2 shows an example of a prior art nested menu in which a subsequent lower level menu functionality item is chosen and selected from a previous list of higher level menu functionality items.
Figure 3:
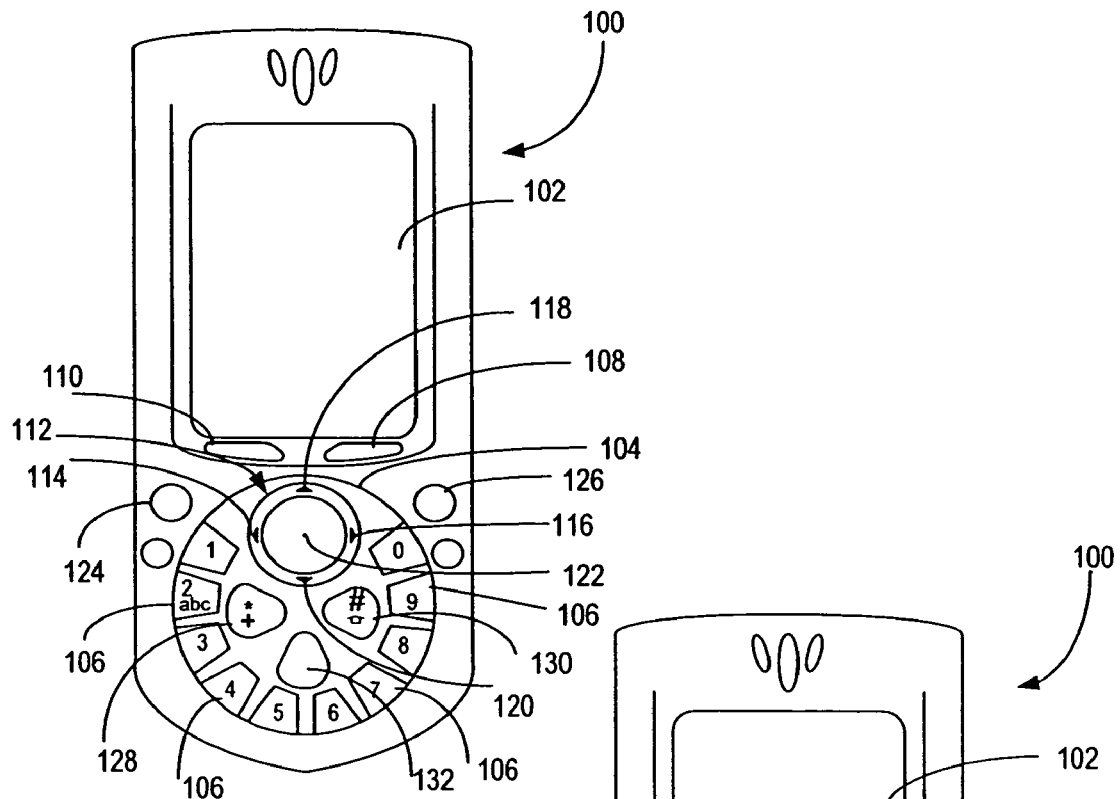
FIG. 3 is a schematic representation of a mobile phone embodying the present invention having hinting capabilities for operation function selection.

Turning now to the drawings and considering the invention in further detail wherein like reference numbers refer to like parts throughout the drawings, FIG. 3 is a schematic representation of a mobile phone such as a cellular telephone embodying the present invention having hinting capabilities for operation function selection and is generally designated 100. The cellular telephone 100 is somewhat conventional in appearance and has a display 102 for showing text or graphics, a keypad or other similar means 104 for inputting alphanumeric characters to the phone by way of alphanumeric keys 106, 106. The cellular telephone 100 also includes means such as contact buttons or switch keys 108, 110 for selecting desired operational functionalities of the cellular telephone. The cellular telephone also includes means such as a scroll key 112 for navigating sub-operational functionalities within a selected operational functionality of the cellular telephone. The functionalities are typical of that available with cellular telephones and may include, for example, short text messaging, connection to the computer global network, selections of prior pre-programmed messages, list of addresses, names, or other typical addresses and information and data associated with conventional cellular telecommunication devices. The scroll key 112 is shown as having directional capabilities which are activated by pressing on the marginal areas 114, 116, 118, 120 to navigate or move about through the particular display graphic, pictorial or text shown on the display 102 in an upward and a downward vertical direction or a sideward left and right horizontal direction. The scroll key 112 also includes a central portion 122 which functions as an entry or selection contact switch typically by pushing on the center of the scroll key to effectuate operation. The cellular telephone 100 additionally includes other control keys, for example, a talk key 124 which is typically used to send a message or to initiate a dialing sequence to complete the call, and a control key 126, for example, which is used to end or terminate a call. The cellular telephone 100 also includes additional control keys 128, 130, 132 which are typically used to access various functions and features of the cellular telephone and as explained in further detail herein below are utilized with other keys to make a user aware of one or more next possible sub-operational functionalities available for user selection in the selected operational functionality, in other words, providing a hinting capability for operation of a next function selection from the current step in the call progression or function access sequence. Although the cellular telephone 100 is disclosed herein in numerous illustrative embodiments of the present invention, it will be recognized that the cellular telephone 100 may also operate in a conventional menu driven mode such as shown, for example, by the menu sequence illustrated in FIG. 2.

Figure 4:
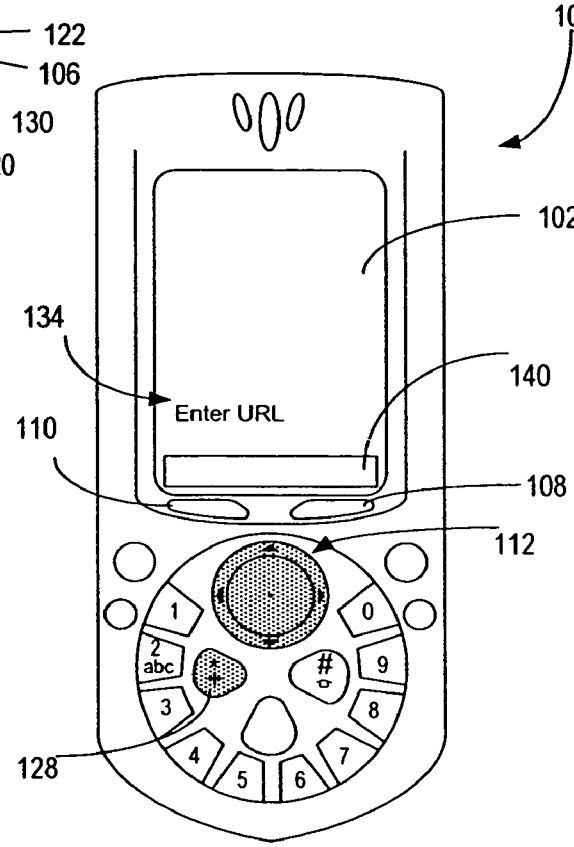
FIG. 4 is a schematic representation of one embodiment of the mobile phone of the present invention with illuminated keys to indicate next possible sub-functionality operations available for selection for accessing the global computer network.
Figures 5, 6:
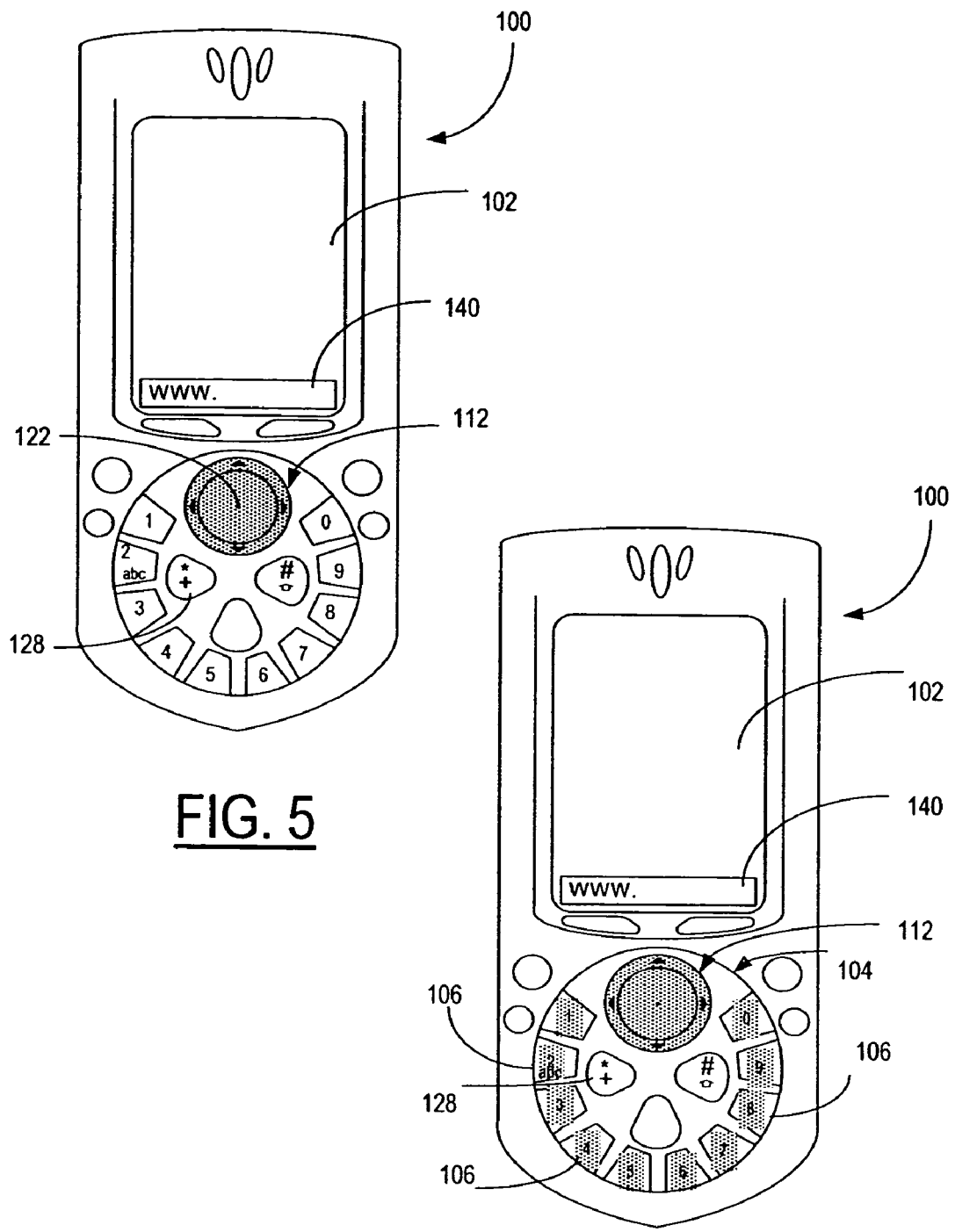
FIG. 5 shows the mobile phone of FIG. 4 wherein the next possible user operation is hinted as a result of operating a corresponding one of the illuminated keys.
FIG. 6 shows the mobile phone of FIG. 5 wherein the next possible user operation is hinted by illuminated keys of the keypad as a result of the beginning character string of a URL address being shown in the window.
Figure 7:
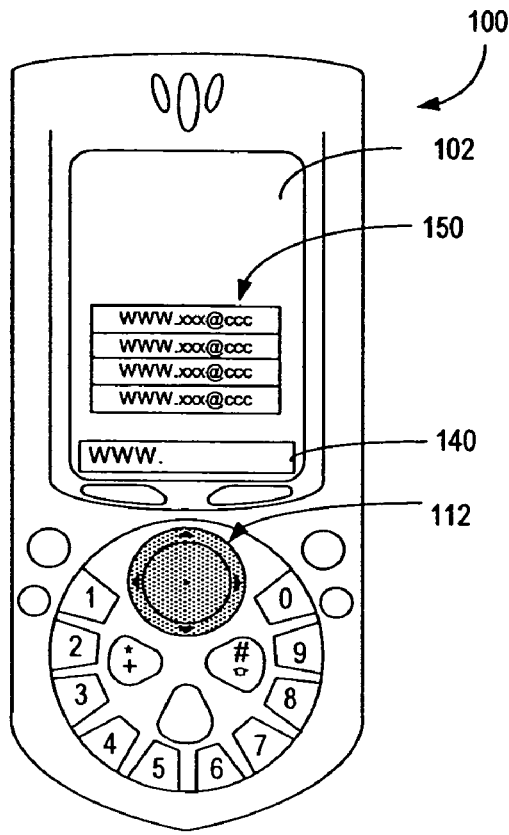
FIG. 7 shows the mobile phone of FIG. 5 wherein a history list of URL's is shown on the display as a result of operating the illuminated scroll key.
Figure 8:
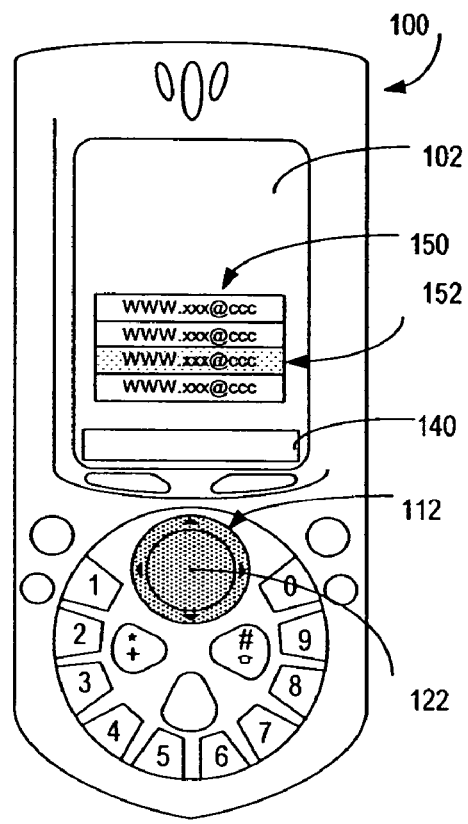
FIG. 8 shows the mobile phone of FIG. 7 wherein the scroll key is illuminated to hint that the scroll key may be operated to move through the URL list to select the desired URL address.

Turning now to FIG. 4, one embodiment of the mobile phone of the present invention has various illuminated keys to hint at or make the user aware of next possible sub-functionality options available for selection and is illustrated schematically therein and generally designated 100. For purposes of explanation and illustration of the invention, the specific desired function selected deals with accessing the global computer network wherein the user has operated one of the selection keys, for example, 108, 110 to initiate the desired operational functionality. As illustrated in FIG. 4, the user is made aware that function to access the global computer network requires an additional action as indicated by the instruction text message "Enter URL" designated 134 and shown on the display 102 and the appearance of a window 140 on the display 102. The user at this stage of the sequence to access the global computer network can either guess at what the next possible step or action should be or in accordance with the present invention, observe that the control key 128 is illuminated and that the scroll key 112 is illuminated. The illuminated keys 128 and 112 hint or suggest to the user that operating one of these keys might somehow be related to the function of entering the URL to gain access to the global computer network. Thus, it is suggested to the user by the cellular telephone 100 by way of the illuminated keys 112, 128 that the user could possibly operate one or the other of these keys to achieve the intended function to access the global computer network. For purposes of example and explanation of the present invention, the user may decide to operate the control key 128 and which operation causes the beginning character string "www." of a URL address to be shown in the text window 140 on the display 102 of the cellular telephone 100 as illustrated in FIG. 5. The appearance of the initial character string "www." of the URL address as illustrated in FIG. 5, suggests to the user and hints that a further entry is required. In this context, the user is aware that the scroll key 112 is illuminated to suggest that this key has a possible operational relationship to the function that is being attempted, and in this example, accessing the computer global network. The user may then operate the scroll key 112 by pushing on the center region 122 which causes a history list of URL's 150 to be shown on the display 102 as illustrated in FIG. 7. The scroll key 112 continues to be illuminated as illustrated in FIG. 7 suggesting to the user that further possible functionality is available through operation of the scroll key 112 such as, for example, the ability to navigate or move through the list of URL addresses shown on the display 102. As illustrated in FIG. 8, the user may navigate through the list of URL addresses using the scroll key 112 to highlight each address to identify to the user the location of the scrolling cursor in a well known manner to select for example a desired address as highlighted and generally indicated 152. If the URL address 152 is the address that the user desires, operating the scroll key 112 by pushing on the center region 122 causes the URL address to appear in the window 140 as illustrated in FIG. 9. Still referring to FIG. 9, the scroll key 112 and the talk key 124 are illuminated suggesting to the user that either one or both of these keys may be available for possible further functionality selection. In this context, the scroll key 112 may be operated to cause the URL address history list 150 to reappear on the display 102 and to make a different URL address available for selection. Alternately, in this context, the user may determine that the selected URL address shown in the window 140 is the desired and correct URL address and then operate the talk button 124 to send the URL address from the cellular phone 100 in a well known manner to access the global computer network.

Referring again to FIG. 4 and considering an alternate user operating sequence, the cellular telephone 100 is illustrated with an illuminated scroll key 112 and illuminated control key 128 to make the user aware of and hint at possible operations for entering the URL address in accordance with the text instruction message "Enter URL" 134 shown on the display 102. In this example, the user operates the illuminated control key 128 with the resulting URL address leading character string "www." being shown in the window 140 of the display 102 as illustrated in FIG. 6. In this context operation of the control key 128 causes the alphanumeric keys 106, 106 of the keypad 104 to illuminate suggesting to the user that the alphanumeric keys 106, 106 are somehow related to the next possible user operation to access or complete the selected desired functionality. In the context presented in FIG. 6, the cellular telephone 100 hints that operation of the alphanumeric keys 106, 106 may be used to enter the remaining characters of the character string for the desired URL address.

Figure 11:
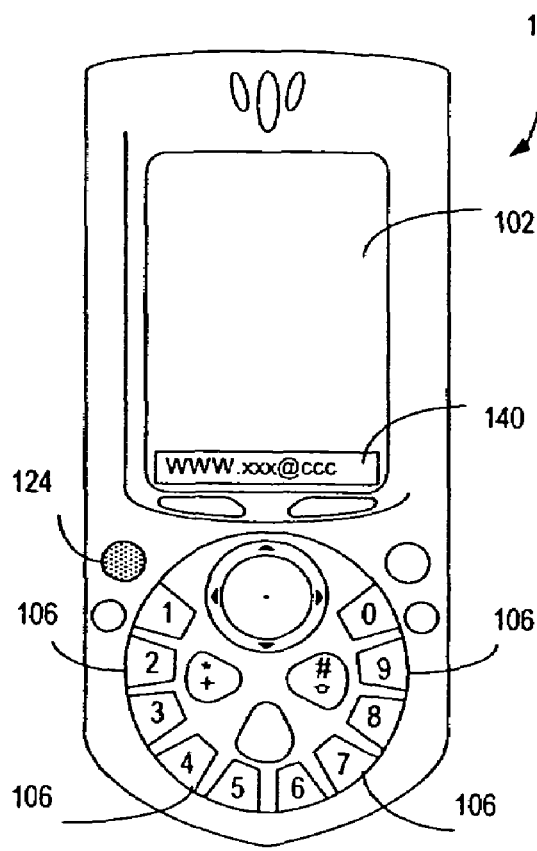
FIG. 11 shows the mobile phone of FIG. 10 wherein the desired URL address has been keyed in and the talk key is illuminated to hint that the URL address can be sent by operating the talk key.

Turning now to FIG. 10, the cellular telephone 100 is illustrated therein with the alphanumeric keys 106, 106 of the keypad 104 illuminated to suggest or hint to the user that the keys 106, 106 are somehow related to the context and sequence of entering the URL address in the window 140. The user then selects the appropriate illuminated alphanumeric keys 106, 106 of the keypad 104 to enter the desired URL address in the window 140 shown on the display 102 as illustrated in FIG. 11. As shown in FIG. 11, the alphanumeric keys 106, 106 are extinguished after the URL address is entered and the talk key 124 is now illuminated suggesting to the user that operation of this key is a next possible function available for access to send the URL address from cellular telephone 100 to access the global computer network.

Figure 12:
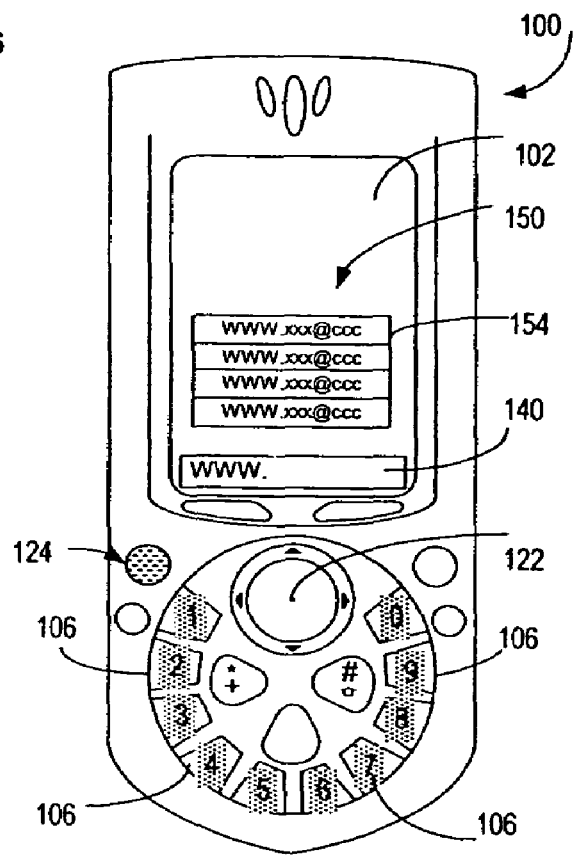
FIG. 12 shows the mobile phone of FIG. 6 wherein the alphanumeric keys of the keypad are illuminated to hint at entering the desired URL address from the look-up list of URL's.

In a further alternate embodiment of the present invention as illustrated in FIG. 12, the cellular telephone 100 shows on the display 102 a history list of URL's 150 as a consequence of operating the scroll button 122, during the sequence progression steps in the desired operational functionality for example, in the context shown in FIG. 6 to bring up and show the history list as illustrated in FIG. 7 and also cause the appearance of the leading character string "www." of a URL address in the window 140. In FIG. 12, the alphanumeric keys 106, 106 are illuminated suggesting to the user that these alphanumeric keys 106, 106 are somehow related to the next possible sub-functionality operation available for selection for accessing the global computer network. In the example shown in FIG. 12, the user may key in the URL address using the alphanumeric keys 106, 106 in accordance with the desired URL address 154 illustrated or shown in the URL history list 150. Upon entry of the appropriate URL address, the talk key 124 will illuminate suggesting to the user that this key is a next possible sub-functionality operation available for selection to complete the access to the global computer network. The alphanumeric keys 106, 106 may continue to be illuminated or may be extinguished in accordance with the desired cellular telephone operation. Likewise, the alphanumeric keys 106, 106 may be illuminated with different colors or may flash on and off to make the user aware of their possible use in the sequence progression and completing the desired functionality.

Figure 13:
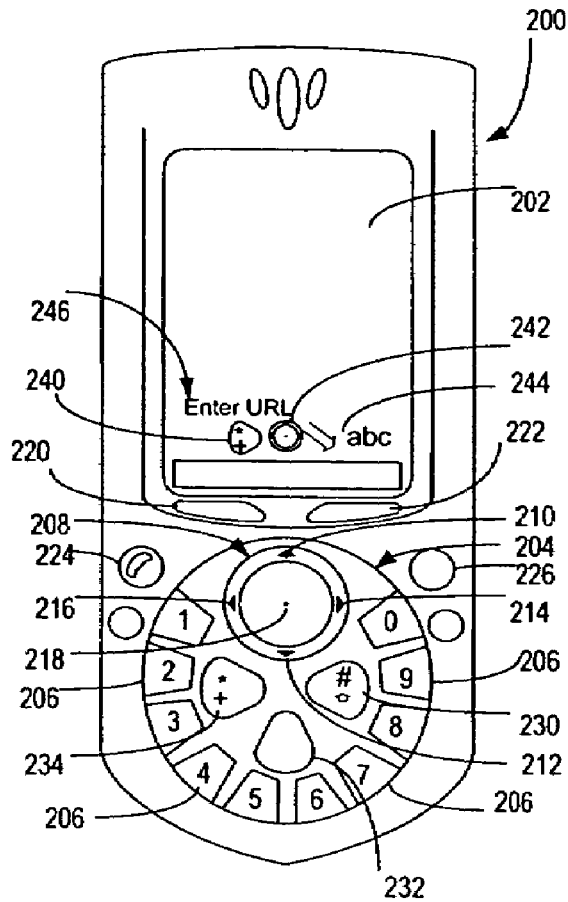
FIG. 13 is a schematic representation of an alternate embodiment of the mobile phone of the present invention showing graphic representations of keys to hint at next possible sub-functionality operations available for selection for accessing the global computer network.
Figure 14:
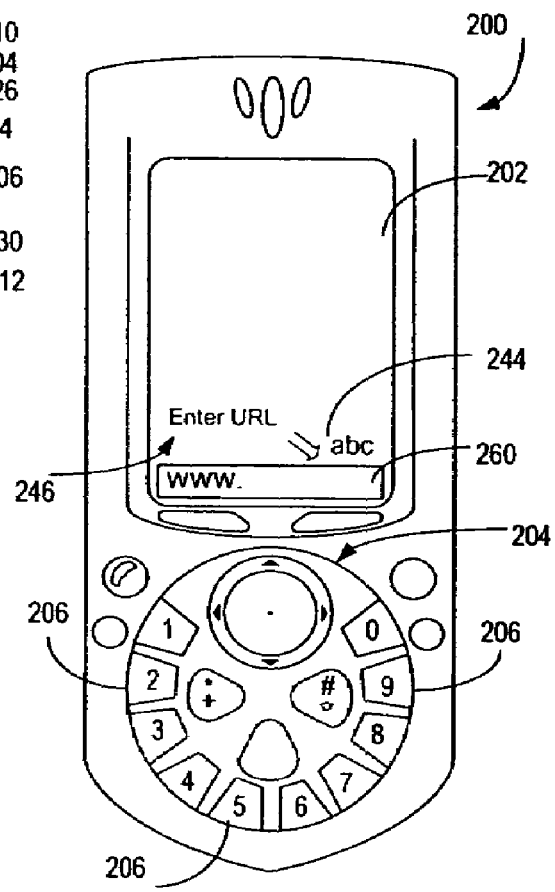
FIG. 14 shows the mobile phone of FIG. 13 wherein completing the beginning character string of a URL address is hinted by the alphanumeric text to suggest operating the alphanumeric keys of the keypad.
Figure 15:
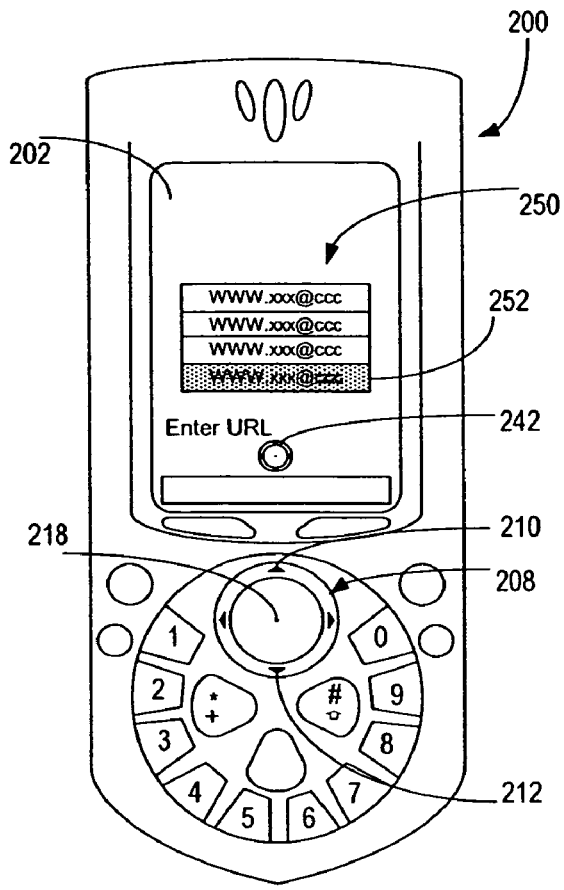
FIG. 15 shows the mobile phone of FIG. 13 wherein entering a URL address is hinted by the scroll key representation to suggest operating the scroll key to enter the URL address.
Figure 16:
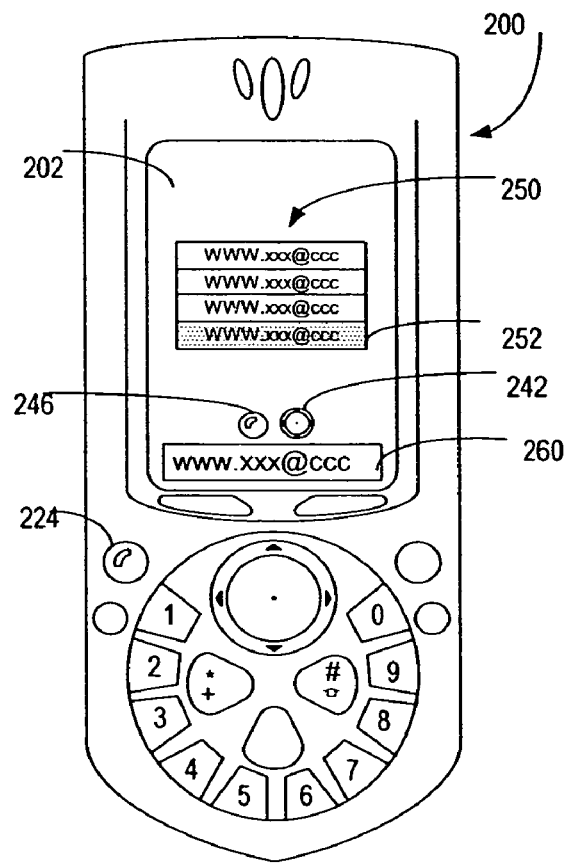
FIG. 16 shows the mobile phone of FIG. 15 wherein the scroll key is shown to hint at moving through a list of URL addresses to select a desired URL address and the talk key is represented to hint the URL address can be sent by operating the talk key.

Turning now to FIG. 13, an alternate embodiment of the mobile phone of the present invention is schematically illustrated therein and generally designated 200. The mobile phone 200 is a cellular telephone and includes a display 202, a keypad generally designated 204 which includes alphanumeric keys 206, 206, a scroll key 208 for controlling the direction of movement of a cursor shown on the display 202 by pressing the outer ring in the area 210 to move upward, 212 to move downward, 214 to move to the right and 216 to move horizontally to the left. The center region 218 of the scroll key 208 is depressed to select or enter the function or feature or to complete the sequence associated with the given operation utilizing the scroll key in the manner well known to those skilled in the cellular telephone art. The keypad 204 also includes a number of control keys 230, 232, 234 which are used in the control and operation of the cellular phone 200. The cellular phone 200 also includes a talk key 224 and an end call key 226 and optionally selection keys 220, 222 for selecting a desired given operational function. By way of example, as shown in FIG. 13 the user desires to access the global computer network and the text message instruction "Enter URL" 246 is shown on the display screen 202. Additionally, a graphic representation or icon 240 corresponding to control key 234 and a graphic representation or icon 242 corresponding to the scroll key 208 is shown on the display to suggest to the user and hint at next possible sub-functionality operations available for selection to access the global computer network. In addition, an "abc marker" icon 244 is shown on the display screen 202 along with the control key icon 240 and scroll key icon 242 again hinting to the user the next possible sub-operational functionalities available for selection. In one possible sequence, the user operates the control key 234 corresponding to the control key icon 240 shown on the display 202 of the cellular phone 200 with the result that the leading character string "www." of a URL address appears in the window 260 on the display 202 as illustrated in FIG. 14. The instruction text message "Enter URL" 246 also appears on the display 202 along with the "abc marker" icon 244, to hint to the user that the missing portion of the character string of the desired URL address may be completed by operating the appropriate alphanumeric keys 206, 206 of the keypad 204 to complete the desired URL address character string in a similar manner as described above in connection with FIG. 10. Alternately, if the user operates the scroll key 208 by depressing the center region 218 as suggested by the scroll key icon 242 in FIG. 13 in response to the instruction text message "Enter URL" 246 a look-up history list of URL addresses 250 would be shown on the display 202 as illustrated in FIG. 15. The instruction text message "Enter URL" 246 continues to be shown on the display 202 along with the scroll key icon 242 to suggest or hint to the user that further operation of the scroll key 208 could cause movement through the list of URL addresses for purposes of selecting a desired address. The navigation through the URL address list 250 is in the upper vertical direction by operating the scroll key portion 210 and downward by operating the scroll key portion 212 much like a joystick to control movement through the list and stopping at a desired URL address, for example, the URL address generally designated 252. The desired URL address is selected by operating the portion 218 of the scroll key 208 with the result that the URL address appears in the window 260 of the display 202 as illustrated in FIG. 16. As illustrated in FIG. 16, the scroll key icon 242 is shown to hint that the user can move through the list of URL addresses 250 to select a different desired URL address other than the address appearing in the window 260 corresponding to the URL address 252. A talk key or icon 246 corresponding to the talk key 224 also appears on the display 202 hinting to the user that the URL address shown in the window 260 can be sent by operating the talk key 224 to send the URL address from the cellular phone 200 to access the global computer network.

Figure 17:
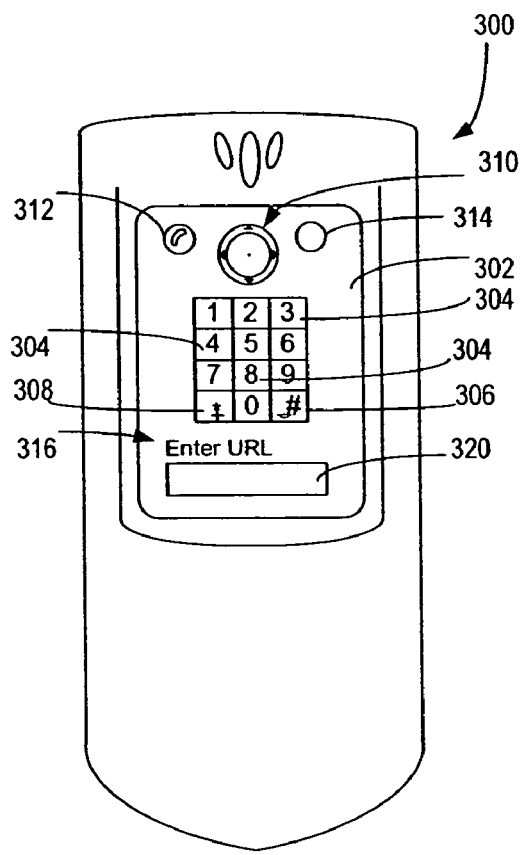
FIG. 17 is a schematic representation of a further alternate embodiment of the mobile phone of the present invention utilizing a virtual keypad shown on the display for the selection and alphanumeric keys to operate the mobile phone.

Turning now to FIG. 17, a further alternate embodiment of the mobile phone of the present invention is schematically illustrated therein and generally designated 300. In this embodiment, the mobile phone is a cellular phone 300 and has a virtual keypad shown on the display 302 and includes a graphic representation of alphanumeric keys 304, 304 each of which may be operated and respond to contact, for example, by a stylus or other pen or screen touch operation to select the desired key as well know to those skilled in the art. The display 302 also includes a graphic representation of a scroll key 310, a talk key 312 and an end call key 314 each of which is likewise operated through contact with a stylus or other means well known to those skilled in the art to effectuate their operation. The display 302 also includes, for example, an instruction text message instruction for a desired given functionality such as the "Enter URL" instruction text message 316 shown on the display 302 generally positioned above a text window 320 also shown on display 302. The alphanumeric keys 304, 304, and control keys 306 and 308 may be illuminated or flash to hint to the user that operation of these keys are related to further sub-functionalities available for accessing the global computer network through entry of a URL address in the window 320 in a similar manner as described above in connection with the cellular phones 100 and 200.

Figure 18:
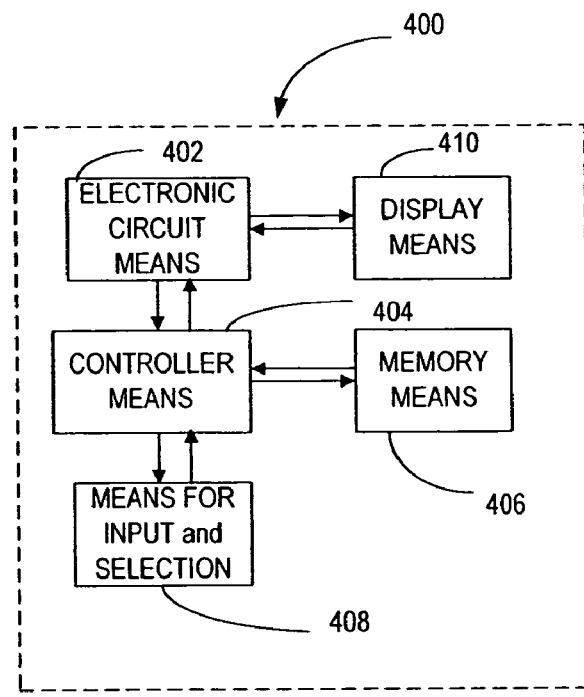
FIG. 18 is a schematic block diagram showing the major functional elements of a mobile telephone embodying the present invention.

A schematic block diagram showing the major functional elements of a mobile telephone such as a cellular telephone embodying the present invention is illustrated in FIG. 18 and generally designated 400. Electronic circuit means 402 appropriate for carrying out the functions of the cellular telephone is provided. A controller circuit means 404 which may be part of the electronic circuit means 402 but for purposes of explanation is shown as a separate functional element in FIG. 18 cooperates with an instruction set contained within a memory means 406 and means for input and function selection 408 and a display means 410 for showing alphanumeric text messages, commands, graphics or other indicia, pictorials and representations as may be desired or required. The operation and interconnection of the major functional elements of the mobile phone are well know to those skilled in the art and the reader is referred to the appropriate literature and instruction manuals that are generally available for further details and which literature and manuals are incorporated herein by reference to the extent needed to provide further explanation of the operation of the major functional elements.

Figure 19:
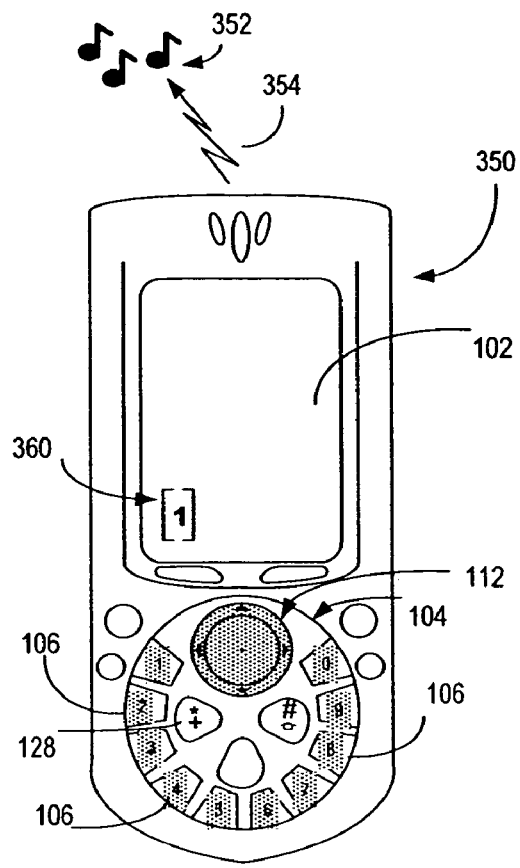
FIG. 19 is a schematic representation of a further alternate embodiment of the mobile phone of the present invention utilizing audio tones to identify keys to hint at next possible sub-functionality operations available for selection.

Turning now to FIG. 19, a schematic representation of a further alternate embodiment of the mobile phone of the present invention is illustrated therein and generally designated 350. The mobile phone 350 utilizes one or more distinctive tones generally represented by the notes designated 352 each of which tones corresponds to a given selection key 106, 112, 128, for example, associated with next possible sub-operational functionalities available for user selection. The various distinctive tones are broadcast from the mobile phone speaker or ear piece as generally indicated by the broadcast arrow symbol 354. It is contemplated that the distinctive tones 352 could be user selectable for assignment to a corresponding selection key as desired. As also indicated in FIG. 19, an icon of a key generally designated 360 corresponding to a short-cut key for carrying out the operational sequence progression steps corresponding to the selected desired operational functionality is illustrated on the display 102. In the illustrated example, a number 1 is shown in brackets on the display screen 102 indicating to the user that the key number 1 on the keypad 104 is the short-cut key to carry out the operational sequence associated with the selected desired operational functionality. For example, the short-cut key shown in the bracket may indicate a save function, a reload function, or a toggle function with each function corresponding to a different identified key.

Figure 20:
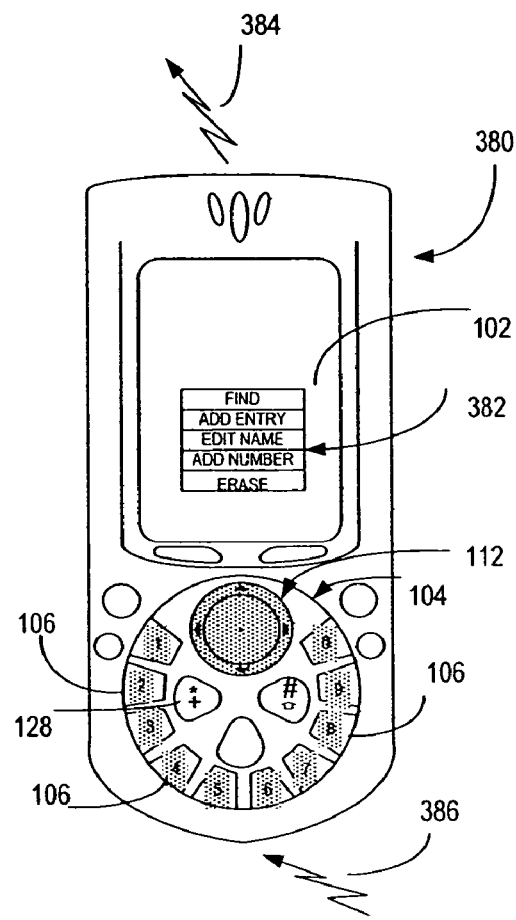
FIG. 20 is a schematic representation of a further alternate embodiment of the mobile phone of the present invention utilizing voice generation to announce next featured selection available from a list of features in a menu driven operational function.

Turning to FIG. 20, a schematic representation of a further alternate embodiment of the mobile phone of the present invention is illustrated therein and generally designated 380. In the mobile phone 380, a menu list of features generally designated 382 is shown on the display 102 wherein one or more of the next feature selections shown in the menu list are available in the menu driven operational function selected. In the embodiment illustrated in FIG. 20, the user is made aware by voice announcement of one or more of the next feature selections available corresponding to the keys on the keypad 104 to hint at the next possible sub-functionality operations available for selection. The voice announcement is generally designated 384 and is transmitted or broadcast from the mobile phone 380 via the speaker or ear piece. For example, the voice announcement may indicate that the "FIND" function is associated with the control key 128 and may be in the form of a voice message "for FIND, press number 2". The user may respond by pressing the appropriate associated key announced by the voice announcement or may respond by speaking the name of the key as generally indicated by the voice response arrow 386 to select the desired sub-functionality.

Figure 21:
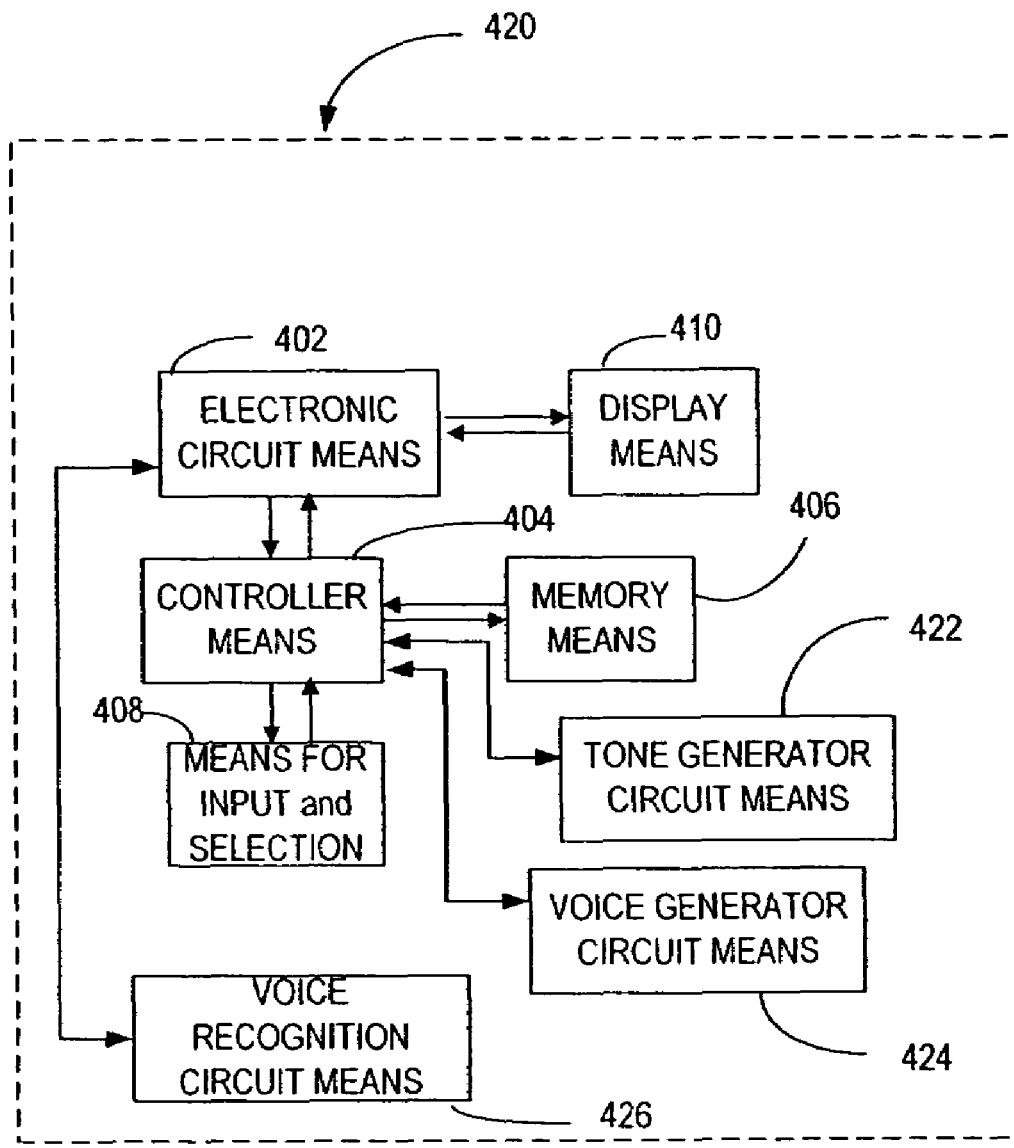
FIG. 21 is a schematic block diagram showing the major functional elements of an alternate embodiment of the mobile phone of the present invention.

Turning now to FIG. 21, a schematic block diagram showing the major functional elements of an alternate embodiment of the mobile phone of the present invention is illustrated therein and generally designated 420. Electronic circuit means 402 appropriate for carrying out the functions of the cellular telephone is provided. A controller circuit means 404 which may be part of the electronic circuit means 402, but for purposes of explanation is shown as a separate functional element in FIG. 21 cooperates with an instruction set contained within a memory means 406 and means for input and function selection 408 and a display means 410 for showing the alphanumeric text messages, commands, graphics or other indicia, pictorials and representations as may be desired or required. A tone generator circuit means 422 cooperates with the controller means to generate the various tones as required to identify the various associated keys for selection. A voice generator circuit means is optionally provided and cooperates with the controller means to provide the voice announcement to alert the user regarding next feature selections available in a menu driven operational function. A voice recognition circuit means generally designated 426 cooperates with the electronic circuit means to recognize voice input to the mobile phone for selecting next features associated with corresponding to the selection key spoken. The operation and interconnection of the major functional elements of the mobile phone are well known to those skilled in the art and the reader is referred to appropriate literature and instruction manuals that are generally available for further details and which literature and manuals are incorporated herein by reference to the extent needed to provide further explanation of the operation of the major functional elements.

Figure 22:
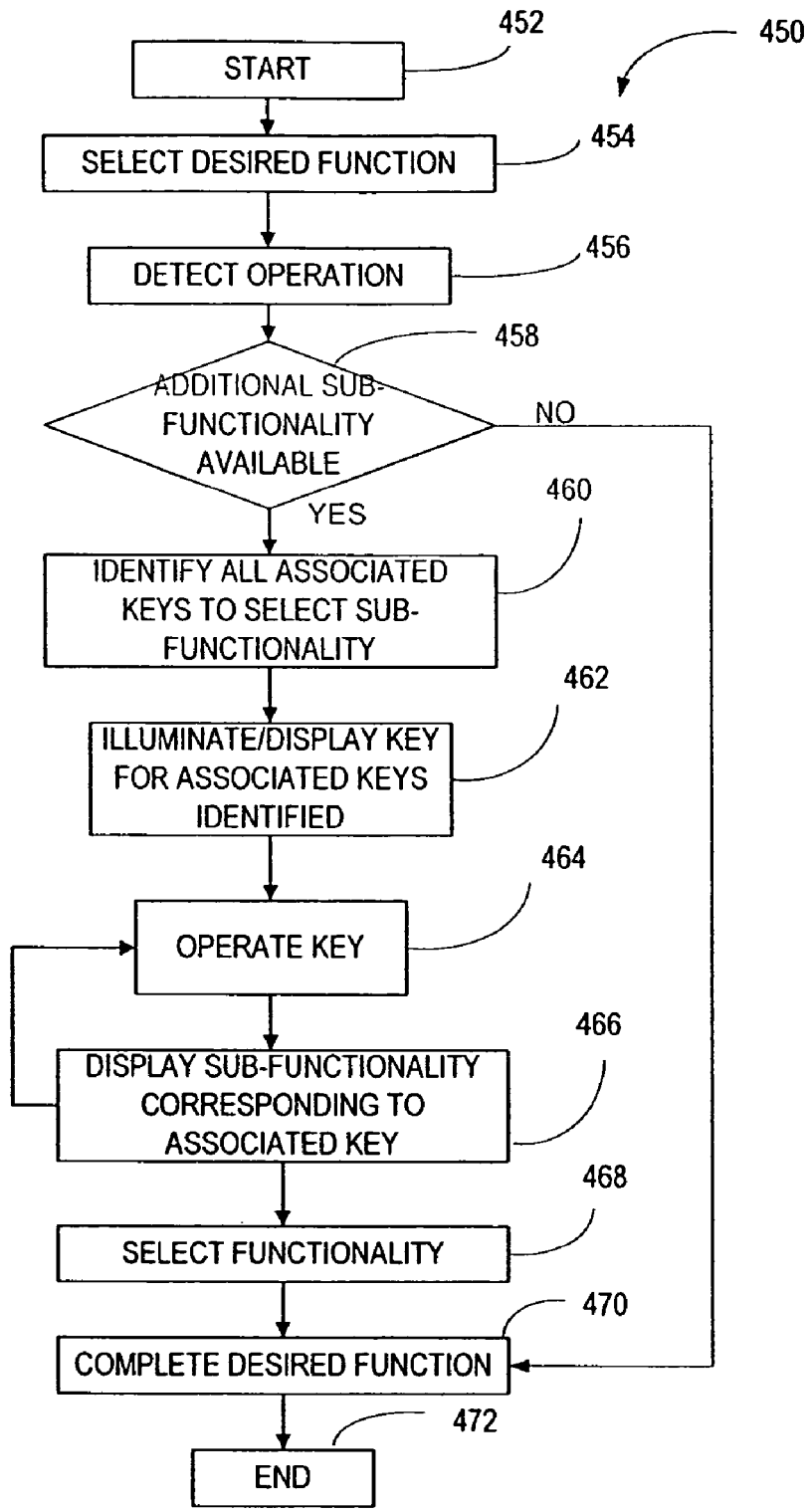
FIG. 22 is a flowchart showing one embodiment of the method of the present invention for hinting at next possible user operation in a mobile telephone.

Turning now to FIG. 22, a flow chart generally designated 450 is illustrated therein showing one embodiment of the method of the present invention for hinting at next possible sub-operational functionalities available for selection corresponding to the given operational context and sequence progression step in the selected desired operational functionality in a mobile telephone, particularly a cellular telephone. The method illustrated in the flow chart 450 begins with the start step 452 wherein the user determines or identifies the particular function or feature and selects the desired function in step 454. The selected desired function is identified and sensed through the detection of operation of a given selection or control key in step 456. The method determines whether or not additional functionalities or sub-functionalities are available in step 458 for the particular operation detected in step 454. If additional functionalities are available, the method moves to step 460 in which all associated keys to select the possible sub-functionalities are identified. The system next moves to step 462 to illuminate or display a key for each of the associated keys identified in step 460. The user then operates in step 464 one of the keys identified in step 460 and illuminated or displayed in step 462. Upon operation of the given key the sub-functionality corresponding to the associated key is displayed in step 466. The method may return to step 464 to operate additional keys and display the sub-functionality corresponding to the associated operated key in step 466. If no additional keys are operated in the method step 464 then the desired functionality is selected in step 468 and the desired function is completed in step 470 with the method ending with step 472. If it is determined in step 458 that no additional functionalities are available for the function selected in step 454 the system moves to the step 470 to complete the desired function and the method ends with the end step 472.

Figure 23:
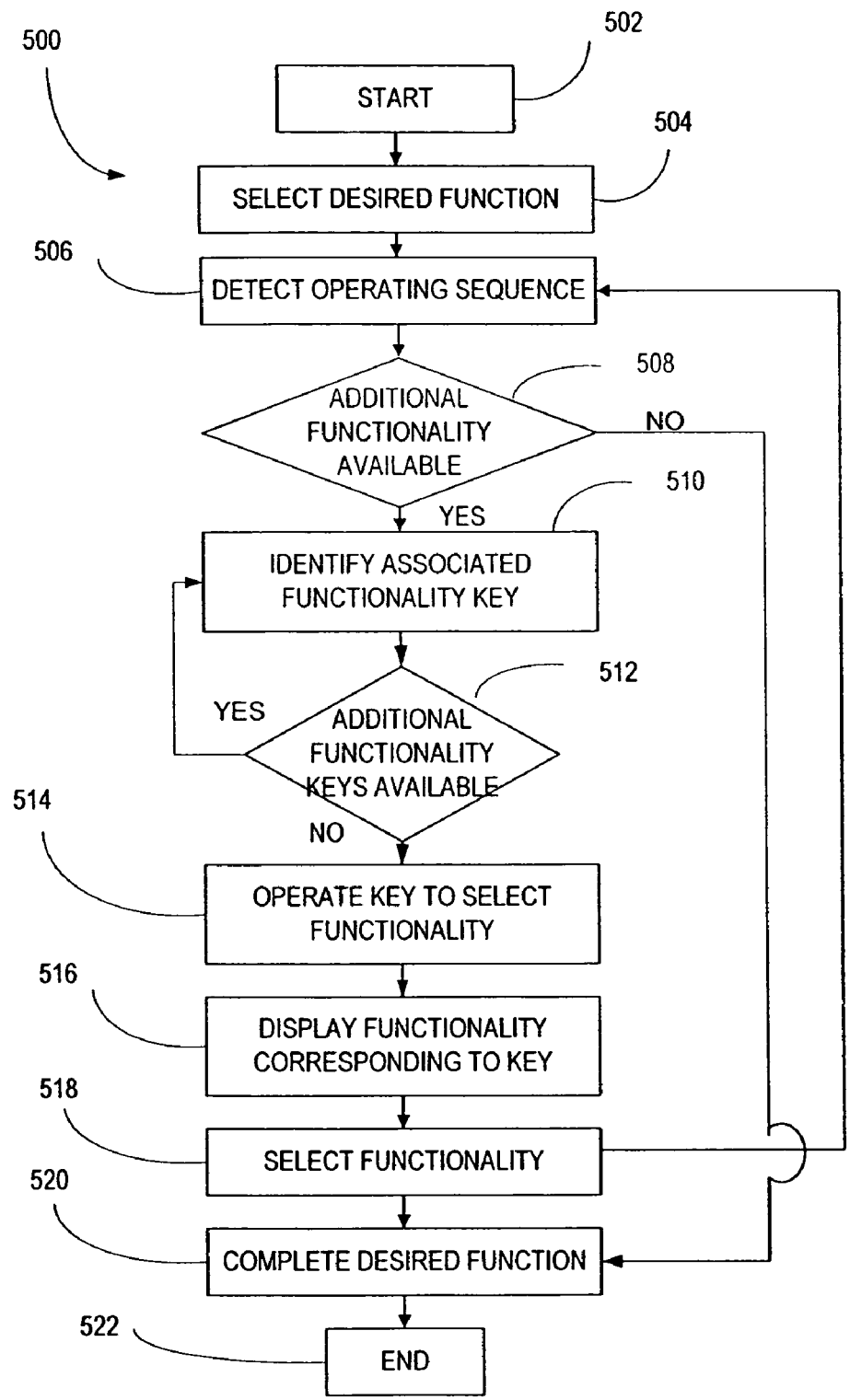
FIG. 23 is a flowchart showing an alternate embodiment of the method of the present invention for hinting at next possible user operation in a mobile telephone.

FIG. 23 illustrates a flow chart generally designated 500 showing an alternate embodiment of the method of the present invention for hinting at next possible sub-operational functionalities available for selection corresponding to the given operational context and sequence progression step in the selected desired operational functionality in the mobile telephone, particularly a cellular telephone. The method begins with the start step 502 wherein the user identifies a particular or specific feature or function is identified. The desired feature or function is selected in 504 and the operation of the key or other action is detected in step 506. It is next detected in step 508 if additional sub-functionalities are available for selection for the desired function selected in step 504 corresponding to the detected operating sequence in 506. If additional sub-functionalities are available, the associated sub-functionality key is identified in step 510. The method then determines in step 512 whether additional sub-functionality keys are available and if so, the method returns to step 510 to identify the associated sub-functionality key. If it is determined in step 512 that no additional sub-functionality keys are available, a key corresponding to the desired functionality is operated in step 514 to select the functionality. The method then moves to step 516 to display the functionality corresponding to the key operated in step 514. The displayed functionality is selected in step 518 and its operating sequence is detected in step 506. The method will then determine in step 508 if additional sub-functionalities are available based on the selected functionality in step 518 and on the operating sequence detected in step 506. If additional sub-functionalities are available as determined in step 508 the method then moves to step 510 to identify the associated sub-functionality key and proceeds as described above. If it is determined in step 508 that no additional sub-functionalities are available for the desired function selected in step 504 as detected through the operating sequence of step 506 the method moves to step 520 to complete the desired function. Likewise, the system moves to complete the functionality selected in step 518 and terminates with the end step 522. It will be recognized and appreciated that multiple iterations may occur depending upon the specific sub-functionality selected in the method causing different associated sub-functionality keys to be identified to hint at next possible user operation according to the given operational context and sequence progression step in the selected desired operational functionality.

Figure 24:
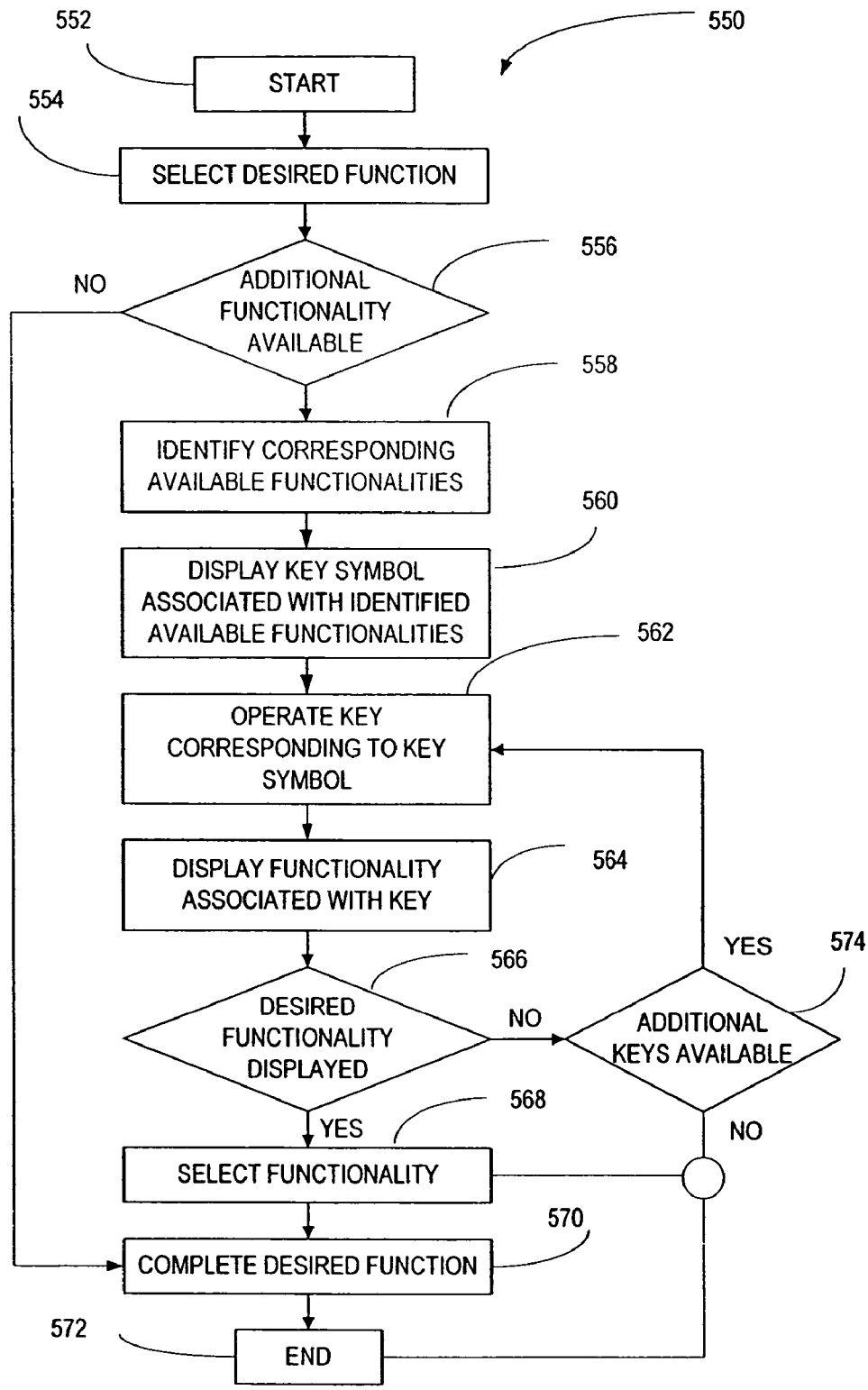
FIG. 24 is a flowchart showing a further alternate embodiment of the method of the present invention for hinting at next possible user operation in a mobile telephone.

Turning now to FIG. 24, a flowchart generally designated 550 illustrates a further alternate embodiment of the method of the present invention for hinting at next possible sub-operational functionality available for selection corresponding to the given operational context and sequence progression step in the selected desired operational functionality during operation of the mobile telephone. The method that begins with the start step 552 wherein the function or feature desired for selection is selected in step 554. The method determines in step 556 additional sub-functionalities available corresponding to the desired function selected in step 554. The system then identifies in step 558 corresponding available functionalities for the selected function. The method then displays all the key symbols or icons associated with the identified available sub-functionalities in step 560. The method then operates a key corresponding to the key symbol or icon displayed in step 562 which causes the functionality associated with the operated key to be displayed in step 564. It is next determined in step 566 if the desired functionality is displayed. If the desired functionality is displayed then the method moves to step 568 wherein the functionality is selected and the desired function is completed in step 570 and terminates with the end step 572. If it is determined in step 556 that no additional sub-functionalities are available, the system moves to step 570 to complete the desired function and terminates with the end step 572. If it is determined in step 566 that the desired functionality is not displayed then the system moves to step 574 to determine if additional keys are available. If additional keys are available then the system moves to step 562 and the key corresponding to the additional available functionality key is operated and the functionality associated with the operated key is displayed in step 564. If the desired functionality is displayed in step 566 then the method moves to step 568 to select the displayed functionality and the method continues as described above. If in step 574 it is determined that no additional keys are available then the method moves to step 568 to select the displayed functionality or terminates with the end step 572.

A mobile telephone such as a cellular telephone having hinting capabilities for making a user aware of possible next functions available for selection corresponding to the given operational context and sequence progression step in the selected desired operational functionality has been described above in several preferred embodiments along with a related method for carrying out the hinting capability in the mobile telephone. Numerous changes and modifications may be made by those skilled in the cellular telephone art, for example, the sequence of presenting a history list of URL addresses may appear at different progression steps other than that described above. In addition, other control keys and selection keys may be available and other activation means such as voice activation and audio response may be employed to carry out the function and intent of the present invention. Therefore, the present invention has been described by way of example rather than limitation.

The invention claimed is:
1. A mobile phone configured and arranged with:
a display for displaying text/graphics;
an arrangement of keys for inputting alphanumeric characters to the phone, selecting desired operational func- tionalities of the phone and navigating sub-operational functionalities within a selected operational functionality; and circuitry configured and arranged for hinting one or more next possible sub-operational functionalities available in said selected operational functionality such that said hinted one or more next possible sub-operational functionalities is communicated via a suitable alerting mechanism, said hinting performed by a non-literal character string match logic process.

2. The mobile phone as defined in claim 1 wherein said suitable alerting mechanism is a first text menu list of suggested next possible sub-functionalities available for selection, said first text menu list being shown on said display in response to a chosen desired operational functionality.

3. The mobile phone as defined in claim 1 wherein said suitable alerting mechanism comprises one or more selection hinting keys configured and arranged for illumination each of which is associated with a next possible sub-operational functionality.

4. The mobile phone as defined in claim 2 wherein a text menu list containing at least one next possible sub-operational functionality is displayed in response to the operation of a corresponding one of said one or more selection hinting keys.

5. The mobile phone as defined in claim 1 wherein said circuitry is further configured and arranged for deactivating said suitable alerting mechanism.

6. The mobile phone as defined in claim 1 wherein said suitable alerting mechanism further comprises one or more user action prompting instructions.

7. The mobile phone as defined in claim 6 wherein said user action prompting instruction is a text message representation.

8. The mobile phone as defined in claim 6 wherein said user action prompting instruction is a graphic message representation.

9. The mobile phone as defined in claim 3 wherein said illuminated selection hinting key is color illuminated.

10. The mobile phone as defined in claim 3 wherein said illuminated selection hinting key is arranged to flash on and off.

11. The mobile phone as defined in claim 1 wherein said suitable alerting mechanism comprises one or more selection hinting keys graphically represented on the mobile phone display each of which graphically represented selection hinting keys is configured and associated with a next possible sub-operational functionality corresponding to the given operational context and sequence progression step in the selected desired operational functionality.

12. The mobile phone as defined in claim 1 wherein said suitable alerting mechanism comprises one or more distinctive tones each of which tones corresponds to a given selection hinting key associated with a next possible sub-operational functionality available for user selection.

13. The mobile phone as defined in claim 1, wherein said suitable alerting mechanism comprises an icon of a selection hinting key corresponding to a short-cut key for carrying out the operational sequence progression steps corresponding to the selected desired operational functionality.

14. A mobile phone configured and arranged with a display for showing text/graphics, an arrangement of keys for inputting alphanumeric characters to the phone and, selecting and accessing desired operational functionalities and features of the phone, at least one menu driven operational function, and, circuitry configured and arranged for hinting one or more possible next feature selections available in the menu driven operational functions said hinting performed by a non-literal character string match logic process.

15. The mobile phone as defined in claim 14 wherein said hinting one or more possible next features circuitry is arranged for highlighting said one or more hinted next feature selections shown in a menu list of features in the menu driven operational function.

16. The mobile phone as defined in claim 14 wherein said hinting one or more possible next features circuitry is arranged for voice announcement of said one or more hinted next feature selections available from a list of features in the menu driven operational function.

17. The mobile phone as define in claim 16 wherein said hinting one or more possible next features circuitry is arranged with voice recognition for responding to a spoken feature selection.

18. A mobile phone configured and arranged with a display screen, a memory for storing at least one instruction set for carrying out the functions of the mobile phone, an arrangement of keys for selecting a desired function and for operating the mobile phone, circuitry configured and arranged for providing a hinting indication of next possible functionalities available for selection corresponding to the operational context and sequence progression steps of the given selected desired function, said hinting indication produced by a non-literal character string match logic process.

19. The mobile phone as defined in claim 18 wherein said circuitry for providing a hinting indication comprises a visual indication of one or more hinting keys each of which hinting keys is associated with a next possible functionality.

20. The mobile phone as defined in claim 19 further comprises a physical keypad.

21. The mobile phone as defined in claim 18 further comprising a virtual keypad.

22. The mobile phone as defined in claim 19 further arranged for showing a text message associated with each of said one or more hinting keys on the display screen to explain the functionality of the key.

23. The mobile phone as defined in claim 19 wherein said visual indication is an illuminated hinting key.

24. The mobile phone as defined in claim 23 wherein said illuminated hinting key is a colored hinting key.

25. The mobile phone as defined in claim 24 wherein said colored hinting key is arranged to change color to provide said visual indication.

26. The mobile phone as defined in claim 18 wherein circuitry for providing a hinting indication further comprises audio tones corresponding to one or more hinting keys each of which hinting keys is associated with a next possible functionality.

27. A mobile phone configured and arranged with a display screen, electronic circuitry for carrying out the operational functions of the phone, a memory coupled to the electronic circuitry for storing at least one instruction set for controlling the operation of the phone, and an arrangement of keys for selecting a desired operational function, and circuitry configured and arranged for hinting at next possible operational functionalities available for selection corresponding to the operational context and progression stage in the given selected desired function, said hinting performed by a non-literal character string match logic process.

28. A method, comprising:
providing hinting capabilities in a mobile telephone by identifying a desired operational function;
selecting the identified desired operational function;
determining additional sub-functionalities available for the selected operational function;

associating a key of the mobile phone with each of the available sub-functionalities as a hinting key; and identifying one or more of the associated hinting keys to hint at one or more of the next possible sub-functionalities available for selection corresponding to the given operational context and sequence progression step in the selected operational function, said hinting performed by a non-literal character string match logic process.

29. The method as defined in claim 28 further comprising identifying all additional next possible functionalities available for selection.

30. The method as defined in claim 28 further comprising illuminating the hinting key for hinting of its availability for selection as a next possible operational functionality.

31. The method as defined in claim 30 wherein illuminating the hinting key further comprises illuminating the hinting key in a color.

32. The method as defined in claim 31 wherein illuminating the hinting key further comprises flashing the hinting key on and off.

33. The method as defined in claim 28 wherein identifying one or more associated hinting keys further comprises showing an icon representing the associated hinting key on the display of the mobile phone for hinting of its availability for selection as a next possible operational functionality.

34. The method as defined in claim 33 wherein the associated hinting key is a short-cut key.

35. The method as defined in claim 28 further comprising providing one or more distinctive audio tones each of which tones corresponds to an identified associated hinting key.

36. The method as defined in claim 28 further comprising operating one or more of the associated hinting keys to select the sub-functionality corresponding to the operated associated hinting key.

37. The method as defined in claim 36 further comprising operating one or more of the associated hinting keys through voice recognition operation by speaking the name of the hinting key.

38. A computer program stored in a computer readable medium for carrying out the method of claim 28.

39. An apparatus, comprising:

means for displaying text/graphics;

means for inputting alphanumeric characters to the apparatus, selecting desired operational functionalities of the apparatus and navigating sub-operational functionalities within a selected operational functionality; and means for hinting one or more next possible sub-operational functionalities available in said selected operational functionality such that said hinted one or more next possible sub-operational functionalities is communicated via a suitable alerting mechanism, said hinting performed by a non-literal character string match logic process.

* * * * *

UNITED STATES PATENT AND TRADEMARK OFFICE
CERTIFICATE OF CORRECTION

PATENT NO.        : 7,403,977 B2                                              Page 1 of 1
APPLICATION NO. : 10/686504
DATED             : July 22, 2008
INVENTOR(S)       : Mika Kalenius and Kimmo Hamynen It is certified that error appears in the above-identified patent and that said Letters Patent is hereby corrected as shown below:

In column 14 at line 1 (claim 14, line 8), please delete "functions" and insert --function,-- therefor.

Signed and Sealed this

Twenty-first Day of October, 2008

JON W. DUDAS
*Director of the United States Patent and Trademark Office*